July 7, 1942.　　　　　F. HEDEN　　　　　2,288,701
SHELL FOOD GATHERING APPARATUS
Filed March 23, 1940　　　3 Sheets-Sheet 2
Fig. 2
Fig. 3
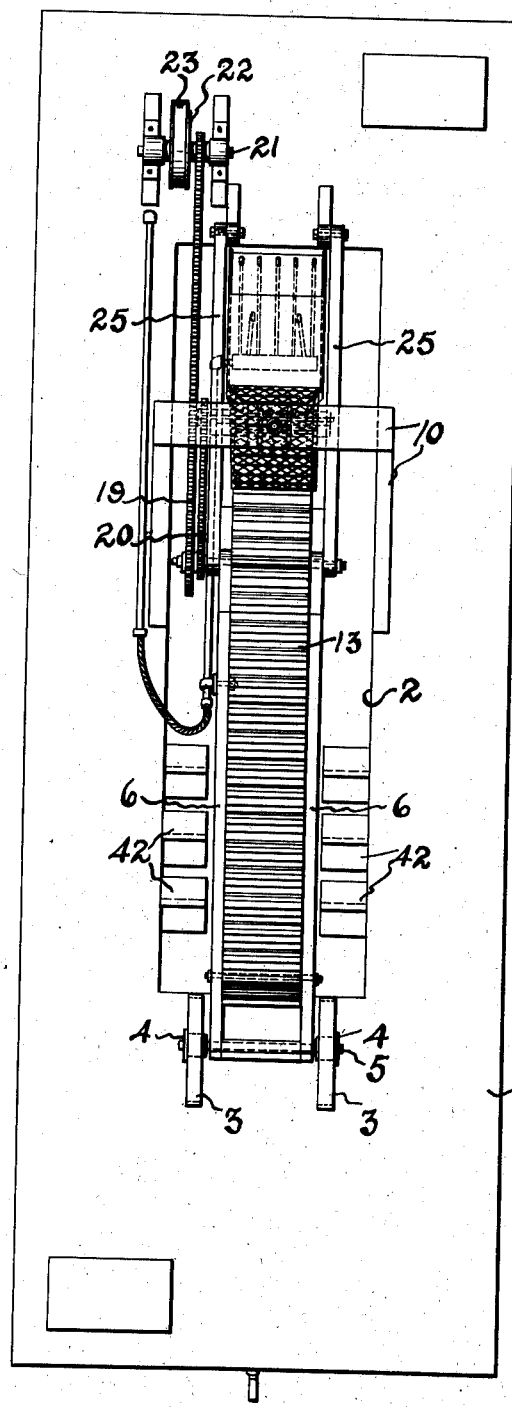
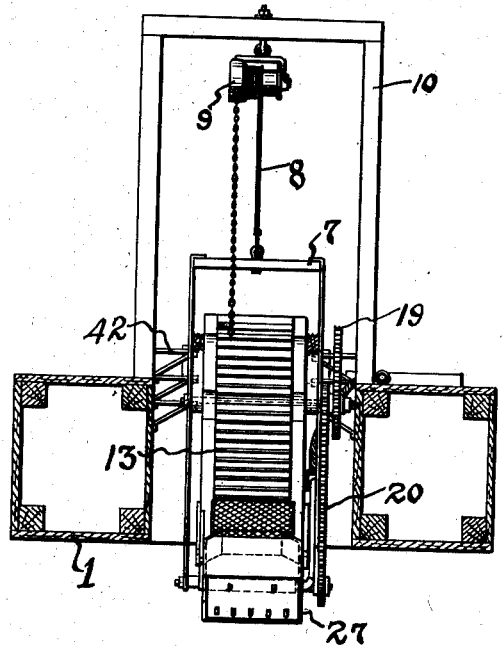
INVENTOR.
Folke Heden
BY Darby & Darby
his Attorneys.

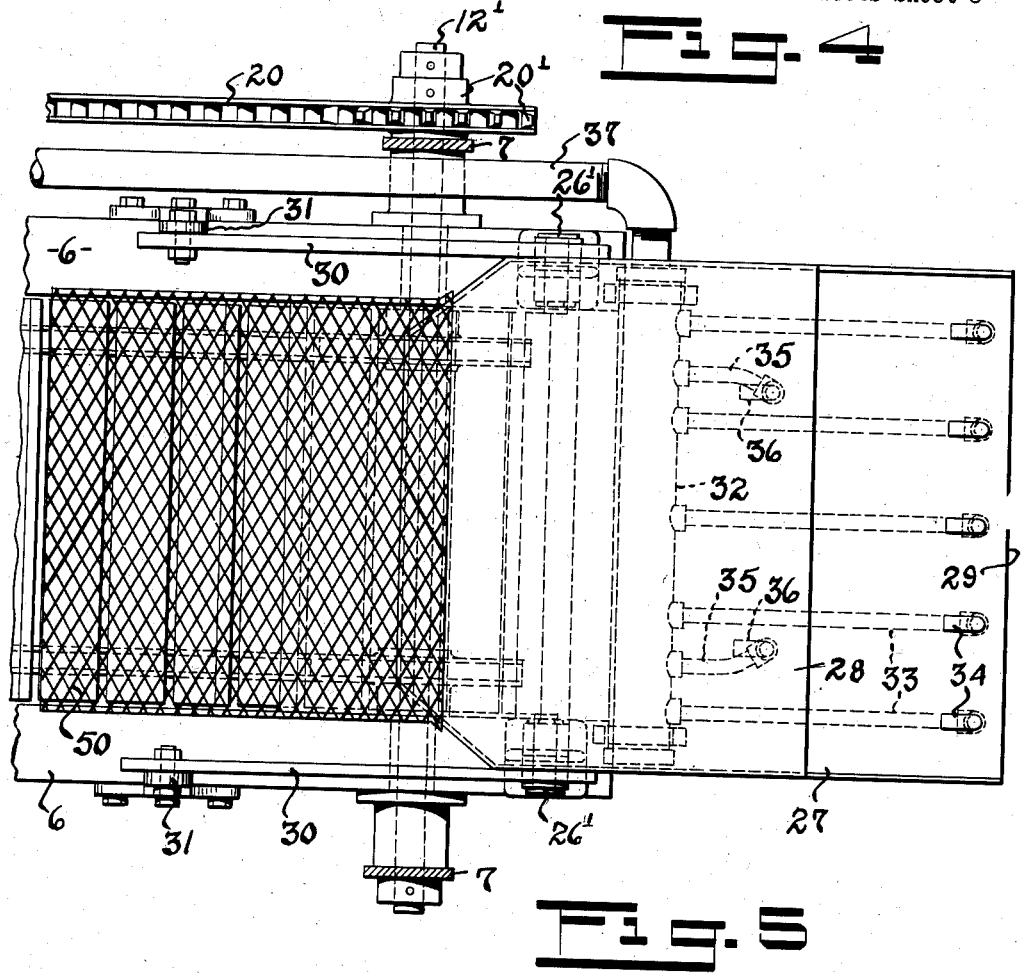
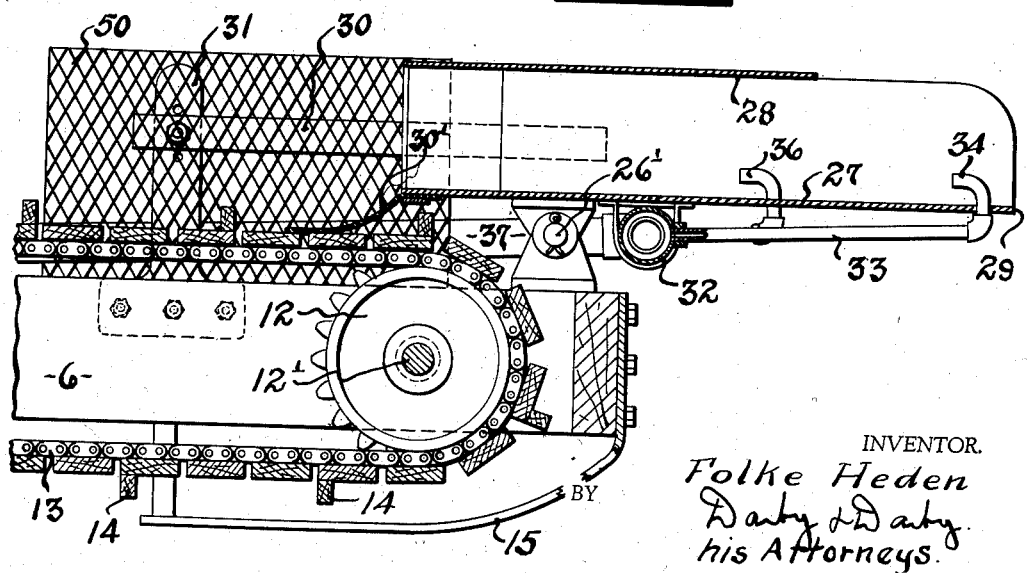

Patented July 7, 1942

2,288,701

UNITED STATES PATENT OFFICE 2,288,701

SHELL FOOD GATHERING APPARATUS

Folke Heden, Brooklyn, N. Y., assignor to Fred Fear & Co., Brooklyn, N. Y., a corporation of New York Application March 23, 1940, Serial No. 325,535

13 Claims. (Cl. 37—55)

This invention relates to improvements in apparatus by means of which shell food is gathered from the beds of water containing it, and more particularly is concerned with improvements in clam digging apparatus.

An important object of the invention is the provision in combination with a suitable support such as a barge or a conveyor, a scoop associated therewith for dislodging the shell food from the bed of the ocean, and fluid jets associated with the scoop for separating the recovered shell food from adhering dirt and sand, and impelling it along the scoop and onto the conveyor.

The other and more detailed objects of the invention will be apparent from the following detailed description of one embodiment thereof.

This invention resides substantially in the combination, construction, arrangement and relative location of parts, as will be described in detail below.

In the accompanying drawings,

Figure 2 is a top plan view thereof;

Figure 3 is a cross-sectional view taken on the line 3—3 of Figure 1;

Figure 4 is an enlarged plan view of the scoop and associated apparatus as viewed from the plane 4—4 of Figure 1; and Figure 5 is a longitudinal, central, vertical, cross-sectional, enlarged view of the scoop and the associated apparatus.

Figure 1:
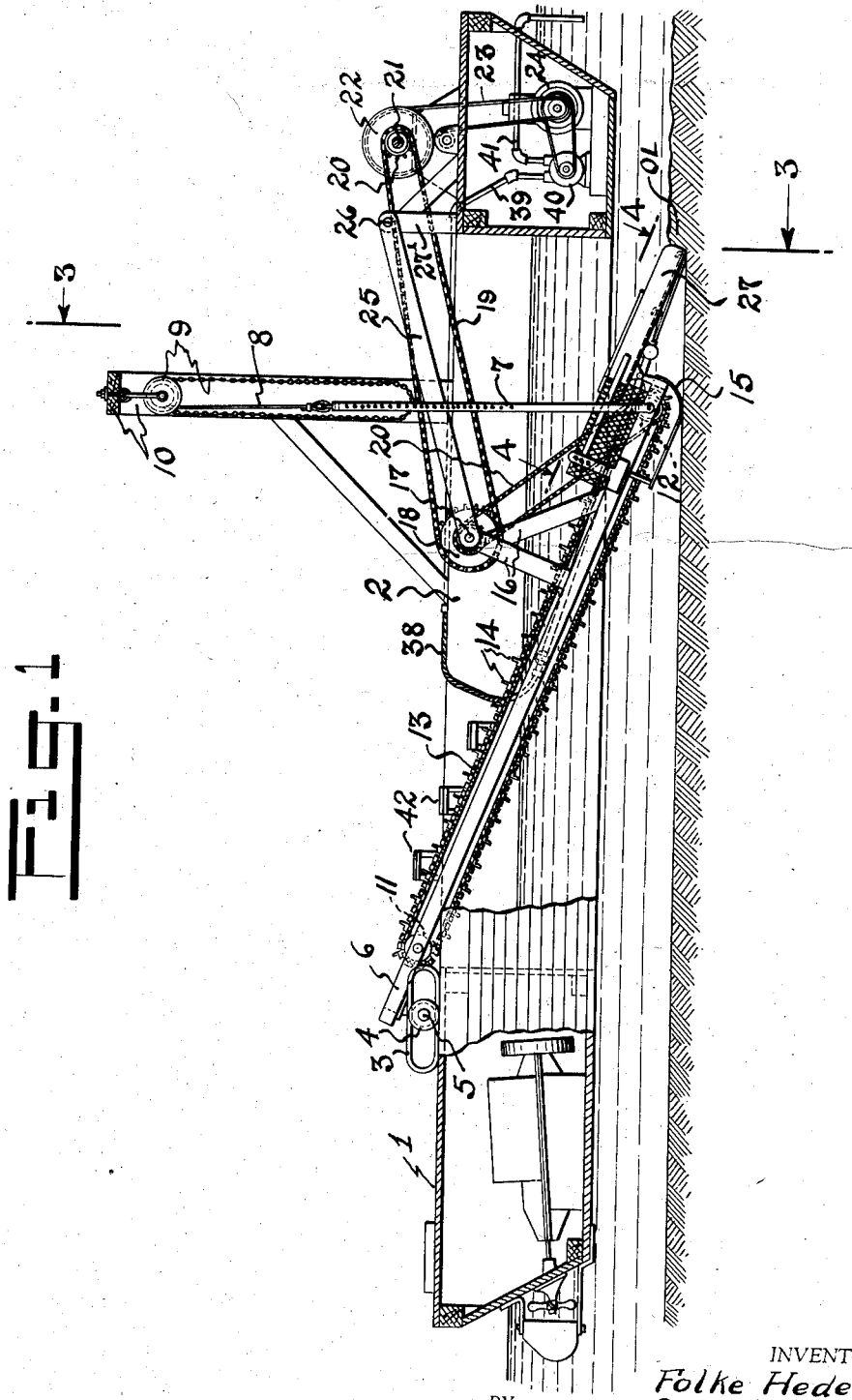
Figure 1 is a longitudinal, vertical, cross-sectional view through the form of apparatus employed to illustrate the invention, showing some parts in elevation.

It is one of the objects of this invention to improve the operation of dredges of the type disclosed in United States Letters Patent No. 2,116,883, issued May 10, 1938. In the operation of apparatus as shown in that patent the portion of the ocean bed which is sheared off by the scoop and which includes as well as the shell food to be recovered, sand, gravel and other materials, is pushed along the scoop, only by reason of the travel of the dredge, and then pushed onto the conveyor by the material following it causing undue strains on the device. Another result is that large quantities of sand, gravel and the like must be carried by the conveyor, some of it adhering to the shell food, making it difficult to recover the clams. This is, of course, not at all desirable. It may be stated as an object of this invention to provide an improved method of moving the shell food through the scoop and onto the conveyor while disposing of all or substantially all of the sand, dirt and other parts of that portion of the surface of the ocean bed which is sheared off by the scoop. This is accomplished in this invention by means of high pressure fluid jets which impel the shell food forcefully to and onto the conveyor while at the same time dispersing the sand and gravel and cleaning the shells of all adhering particles. The result is that the clams, oysters, or the like which are being recovered are delivered by the conveyor to the deck of the barge in a clean condition while leaving behind all the sand and gravel which settles back to the ocean bed.

A further and important object of the invention is the removal of the sand and gravel from the region of the lip of the scoop and the rapid dispersion thereof. In apparatus as disclosed in the above-mentioned patent the portion of the ocean bed which is sheared off by the scoop naturally piles up in the scoop, quickly offering much resistance to the travel of the varying portions of the ocean bed into the scoop. In other words, the piling up of the sand and gravel within the scoop creates strains on the apparatus which are not created in the apparatus of this invention because as rapidly as the sand and gravel enter the mouth of the scoop the fluid jets project it towards the rear end of the scoop and break it up or disperse it. The result is therefore that the scoop is substantially always in the condition as illustrated in Figure 1 of the drawings, a condition which only exists at the very beginning of the shearing action in the use of the scoop of the above patent.

The high pressure fluid jets create a turbulence in the water adjacent thereto which efficiently breaks up the sand and gravel into individual particles, thereby insuring the quick dispersion thereof, as well as freeing the clams and the like of adherent sand and dirt, that is in effect thoroughly washing them.

Referring now in detail to the drawings the form of apparatus illustrated includes a barge or scow 1 of any suitable construction and size built so as to have a well 2 within the boundaries thereof, as is particularly clear from Figure 2. Mounted on the deck of the barge at the stern end of the well on opposite sides thereof are a pair of guide or track members 3 built in the form of closed loops of any suitable material such as metal and providing tracks for a pair of wheels 4. These wheels are connected by a shaft 5 so that they may move longitudinally of the barge in unison. Mounted on the shaft 5 is a framework which includes a pair of stringers 6 which extend down into the well 2. The lower end of this framework is pivotally connected to a hook 7 (see particularly Figure 3), which is supported at its upper end by a cable or rope 8 and a chain hoist 9. The hoist is mounted on a vertical framework 10 supported on the deck of the barge and straddling the well towards the bow end. Journalled near the upper end of the framework which includes the stringers 6 are sprocket wheels 11 and likewise on similar framework near its lower end are a pair of sprocket wheels 12. Mounted on these sprocket wheels is a continuous chain or belt conveyor provided with suitably spaced battens 14 which extend transversely thereof. Mounted on the lower end of the framework so as to project thereunder is an apron or guard 15 by means of which the lower end of the conveyor and associated apparatus on the framework is prevented from engaging the ocean bed. In other words, the conveyor and associated apparatus is protected against interference with its proper operation and damage by reason of contact with the ocean bed. A shaft 17 is rotatably supported on a framework 16 which in turn is secured to the conveyor framework towards the lower end thereof, as is clear from Figure 1. On the shaft 17 is a sprocket wheel 18 connected by a chain 19 to a sprocket wheel 20 on a shaft 21 journaled on a suitable support on the deck near the bow. Shaft 21 is also provided with a pulley 22 which is connected by a belt 23 to any suitable power source 24 (see Figure 1). Also mounted on the shaft 17 is a smaller sprocket wheel which is connected by a chain belt 20 to a sprocket wheel 20' (see Figure 4) mounted on the shaft 12' on which the lower conveyor belt sprockets 12 are also mounted (see Figures 4 and 5). Links 25 are pivotally connected to the ends of shaft 17 and at 26 to supports 27' on the deck of the barge at the bow end of the well.

The scoop is shown at 27 and consists generally of a bottom and a pair of side walls so that it is open at the ends and top. It is partially closed at the top by means of a cover or roof 28 which terminates short of the entering end 29 (see Figure 5) of the scoop. The scoop is of course preferably made of metal and is pivotally mounted at 26' on the lowermost end of the conveyor belt frame, as clearly shown in Figures 4 and 5. Secured to the sides of the scoop in any suitable manner as by bolting, riveting, welding and the like are a pair of rearwardly projecting arms 30 which are secured to standards 31 bolted to the sides of the conveyor belt frame. These standards are provided with a series of equally spaced openings to which the rear ends of the arms 30 can be bolted at various elevations. With this construction the tilt of the scoop with respect to the plane of the conveyor belt frame may be determined. Thus for different angles of inclination of the conveyor belt frame the plane of the scoop may be adjusted to secure the most efficient action of the scoop. The rear end of the scoop is provided with a flexible portion 30' which rests on the conveyor, as is clearly shown in Figure 5, to insure that the clams and the like when they emerge from the scoop will be delivered onto the conveyor. To further insure this object a perforated tunnel 50 comprising sides and a top of perforated metal or screen is mounted on the conveyor frame at the rear end of the scoop so that the clams emerging from the scoop will be directed onto the conveyor and prevented from falling off it. It will be seen later that the clams and the like are more or less projected from the rear end of the scoop and are liable to fall back onto the ocean bed unless they are prevented from doing so during the period when they are settling down on the conveyor.

Mounted on the underside of the bottom of the scoop and extending transversely thereof is a manifold 32 which is provided with a series of branch pipe connections 33 extending towards the mouth of the scoop. Mounted on the ends of the branch pipes 23 are nozzles 34 which project upwardly through the bottom of the scoop and point towards the rear thereof, as is clear from Figure 5. A plurality of shorter branch pipes 35 extend towards the mouth of the scoop from the manifold and are provided with nozzles 36 which extend upwardly through the bottom of the scoop and point towards the rear thereof. A fluid pressure supply connection 37 extends from the manifold 32 upwardly along the side of the conveyor frame as shown in Figure 1, and is connected by a flexible hose 38 to a pipe 39 extending along the deck of the barge and to the discharge port of a pump 40 driven by the power source 24. The suction pipe 41 for the pump dips into the water as is clearly shown.

Mounted on the sides of the well of the barge adjacent the sides of the conveyor are a series of seats 42 on which operators sit so that they may pick the clams from the conveyor as they are carried upwardly.

A brief description of the operation of this apparatus will now be presented.

A barge is either towed or driven by the usual propelling means so that it progresses slowly over a clam bed. The hoist 9 is operated so that the lower end of the conveyor framework is dropped down to a position where the scoop 27 may penetrate the ocean bed to a desired depth, as is illustrated in Figure 1. Depending upon the angle of inclination of the conveyor framework the plane of the scoop 27 may be adjusted from experience or trial to the desired angle with respect to the conveyor framework by bolting the arms 30 in the proper holes in the standards 31. With the power plant 24 operating the conveyor is caused to rotate so that the upper flight thereof moves upwardly as will be apparent to those skilled in mechanical arts. At the same time the pump 40 operates delivering sea water by a sufficient pressure to the nozzles 34 and 36 so that jets of water are projected therefrom towards the rear end of the scoop. A suitable operating pressure for the jet fluid is about 80 pounds per square inch. As the barge advances the scoop 27 shears off the surface layer OL (Figure 1) of the ocean bed, which contains the clams or other shell food to be recovered. The depth that the scoop penetrates the ocean bed is of course determined by experience in order to insure as complete a recovery of the embedded clams as is practical to procure. The forward movement of the barge causes the mouth of the scoop to move along in a horizontal plane, with the result that the sheared off layer advances into the scoop. The nozzles 34 are so positioned that as soon as the sheared portion of the bed enters the scoop it comes into the influence of the high velocity jets of water emerging from the nozzles 34. It, as well as the shell food contained therein is therefore quickly broken up and impelled towards the rear of the scoop. The nozzles 36 placed rearwardly of the nozzles 34 aid in this movement and insure that all the material entering the scoop will be discharged at the rear end thereof. The sand, gravel and the like, due to the turbulence created by the water jets floats out through the reticulated tunnel 50 and down between the cross-slats of the conveyor while the clams and the like are confined to the conveyor on which they settle before they move beyond the perforated tunnel. They are carried upwardly by the conveyor from which they are removed by operators at the stations provided by the seats 42.

It will be seen from the above description that the scoop never fills up with sand and gravel, with the result that the following material from the ocean bed does not have to force it through the scoop as in the case of the apparatus of the above mentioned patent. It will also be apparent that the clams and the like are thoroughly cleaned of any adherent material so that they reach the conveyor thoroughly cleaned.

From the above description it will be apparent to those skilled in the art that the invention herein disclosed may be embodied in other physical forms without departure from the scope of the novelty herein set forth. I do not, therefore, desire to be strictly limited to the disclosure, but rather to the scope of the claims granted me.

What is claimed is:

1. In an apparatus of the type described, a support comprising a ship hull, a conveyor mounted on said support so as to extend below it, a scoop mounted adjacent the receiving end of the conveyor, and means mounted on the scoop for producing high velocity fluid jets at and directed from the mouth towards the rear of the scoop along its bottom wall.

2. In an apparatus of the type described a float having a well therein, a framework supported in said well so as to project below the bottom of the float, a continuous conveyor mounted on said framework, a scoop mounted on the lower end of the framework and positioned to discharge onto said conveyor, a plurality of spatially distributed nozzles mounted in the scoop, some at its mouth, and pointing towards the rear thereof, and means for supplying fluid to said nozzles under pressure, the fluid from said nozzles keeping the mouth of said scoop clear.

3. In a device of the type described a barge having a well therein, a conveyor mounted in said well and positionable so as to project below the bottom of said barge, a scoop mounted adjacent the lower end of the conveyor, and fluid pressure means on said scoop at its mouth for moving material through the scoop and onto the conveyor.

4. In a device of the type described a barge having a well therein, a conveyor mounted in said well and positionable so as to project below the bottom of said barge, a scoop mounted adjacent the lower end of the conveyor, fluid pressure means on said scoop for moving material from its mouth and through the scoop and onto the conveyor, and a reticulated tunnel surrounding the discharge end of the scoop and the conveyor.

5. In a device of the type described a barge having a well therein, a conveyor mounted in said well and positionable so as to project below the bottom of said barge, a scoop mounted adjacent the lower end of the conveyor, fluid pressure means on said scoop for moving material through the scoop and onto the conveyor, a reticulated tunnel surrounding the discharge end of the scoop and the conveyor, and a flexible apron extending from the scoop to and resting on said conveyor.

6. In a sea food dredging apparatus the combination including a barge, a conveyor mounted on said barge so that the lower end thereof is adjacent the bed of the body of water in which the barge floats, a scoop supported so that it discharges onto the conveyor, and means in the scoop for progressing material picked up by the scoop from its receiving to its discharge end.

7. In a sea food dredging apparatus the combination including a barge, a conveyor mounted on said barge so that the lower end thereof is adjacent the bed of the body of water in which the barge floats, a scoop supported so that it discharges onto the conveyor, and pressure fluid means for moving material picked up by the scoop from its receiving to its discharge end.

8. In a sea food dredging apparatus the combination including a barge, a conveyor mounted on said barge so that the lower end thereof is adjacent the bed of the body of water in which the barge floats, a scoop supported so that it discharges onto the conveyor, a plurality of nozzles mounted in the scoop and arranged to discharge towards the rear end of the scoop, and means for supplying fluid at high pressure to said nozzles.

9. In a dredge for recovering shell food from the ocean bottom, the combination including a barge, a frame-work positionably mounted on the barge so as to project into the water to a point adjacent the ocean bed, a continuous conveyor mounted on said framework, a scoop pivotally mounted on the lower end of the framework, means for locking the scoop in various pivoted positions, and fluid pressure means on the scoop for removing material from the mouth of the scoop.

10. In a dredge for recovering shell food from the ocean bottom, the combination including a barge, a framework positionably mounted on the barge so as to project into the water to a point adjacent the ocean bed, a continuous conveyor mounted on said framework, a scoop pivotally mounted on the framework so that its discharge end is above the conveyor, means on the scoop for moving material from its receiving to its discharge end, and an apron for closing the gap between the discharge end of the scoop and the conveyor.

11. In a dredge for recovering shell food from the ocean bottom, the combination including a barge, a framework positionably mounted on the barge so as to project into the water to a point adjacent the ocean bed, a continuous conveyor mounted on said framework, a scoop pivotally mounted on the framework so that its discharge end is above the conveyor, fluid jet means on the scoop for moving material from its receiving to its discharge end, an apron for closing the gap between the discharge end of the scoop and the conveyor, and a reticulated tunnel enclosing the discharge end of the scoop and the adjacent portion of the conveyor.

12. In a dredge for recovering shell food from the ocean bottom, the combination including a barge, a framework positionably mounted on the barge so as to project into the water to a point adjacent the ocean bed, a continuous conveyor mounted on said framework, a scoop pivotally mounted on the framework so that its discharge end is above the conveyor, fluid pressure jet means in the scoop for moving the contents of the scoop to its discharge end from its receiving end.

13. A dredge for recovering shell food from the ocean bed comprising a barge, a framework mounted on the barge having rollers operating on the deck of the barge, means connecting the other end of the framework with the barge, means for raising and lowering that end of the framework, a conveyor mounted on the framework, a scoop mounted on the framework so as to discharge onto said conveyor, and fluid pressure means mounted on the scoop for moving the contents of the scoop through it from its mouth and on to the conveyor.

FOLKE HEDEN.